J. T. ONSTOTT.
TRACTOR CUT-OUT PLOW.
APPLICATION FILED APR. 15, 1919.
1,360,014.
Patented Nov. 23, 1920.
2 SHEETS—SHEET 1.
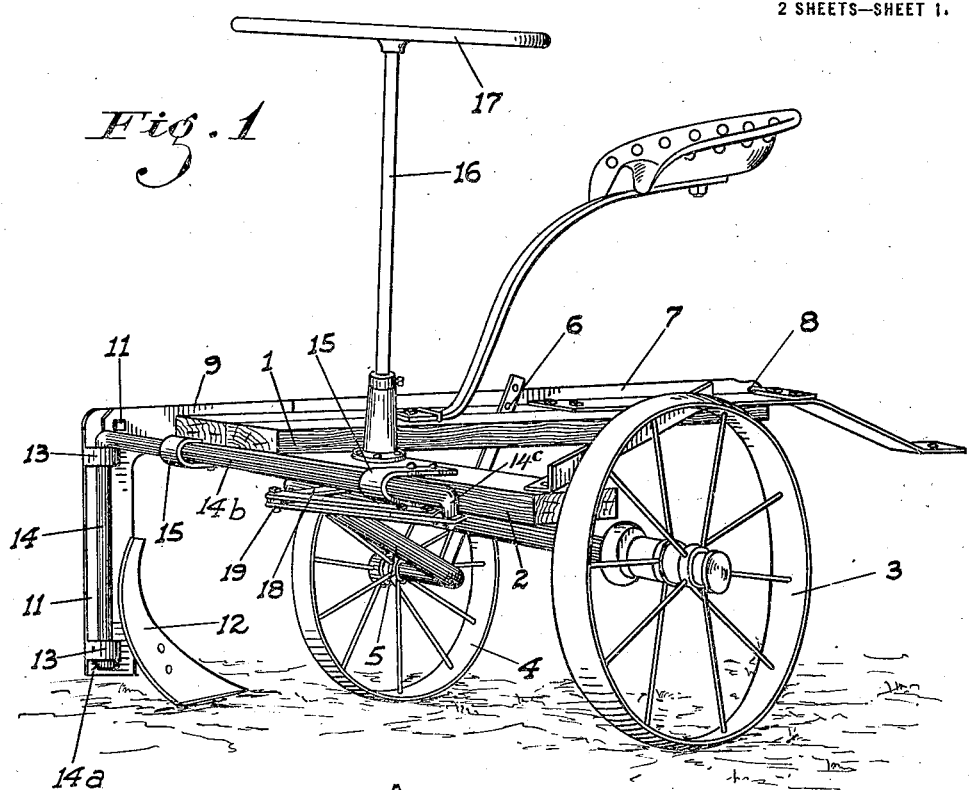
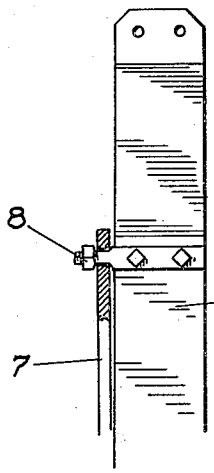
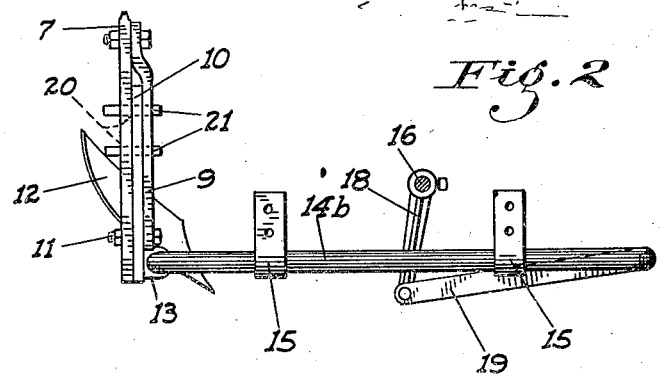
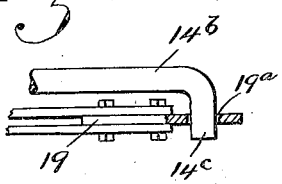
INVENTOR
Jacob T. Onstott
BY
S. Webster
ATTORNEY J. T. ONSTOTT.
TRACTOR CUT-OUT PLOW.
APPLICATION FILED APR. 15, 1919.
1,360,014.
Patented Nov. 23, 1920.
2 SHEETS—SHEET 2.
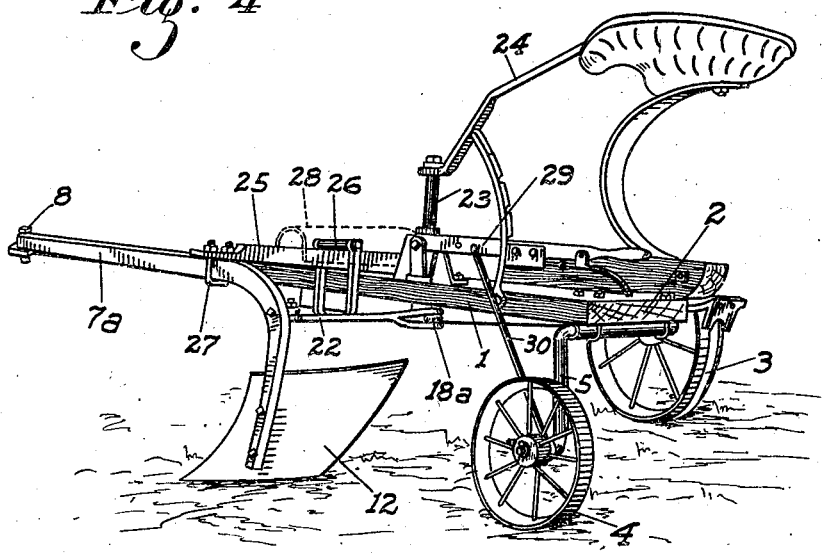
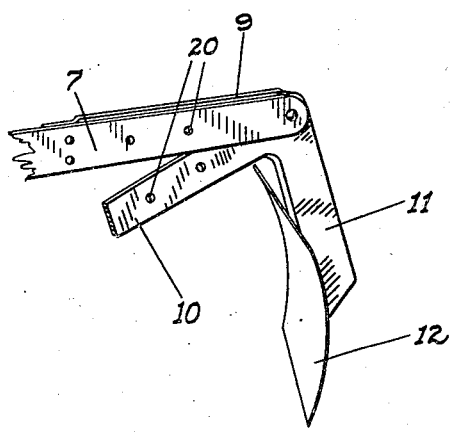
INVENTOR
Jacob T. Onstott
BY
ATTORNEY

UNITED STATES PATENT OFFICE.

JACOB T. ONSTOTT, OF YUBA CITY, CALIFORNIA, ASSIGNOR TO ERNEST E. SOWELL, OF SACRAMENTO, CALIFORNIA.

TRACTOR CUT-OUT PLOW.

1,360,014.      Specification of Letters Patent.      Patented Nov. 23, 1920.

Application filed April 15, 1919. Serial No. 290,255.

*To all whom it may concern:*

Be it known that I, JACOB T. ONSTOTT, a citizen of the United States of America, residing at Yuba City, in the county of Sutter and State of California, have invented certain new and useful Improvements in Tractor Cut-Out Plows; and I do declare the following to be a clear, full, and exact description of the same, reference being had to the accompanying drawings and to the characters of reference marked thereon, which form a part of this application.

This invention relates to improvements in farm implements and particularly to plows to be drawn by tractors and adaptable for use in vineyards and orchards to plow in line with and between the trees and vines without injuring the same.

The principal object of the invention is to provide a means for moving the plow beam and plowing device in and out between the trees and vines and at the same time hold it rigid against vertical movement thereof.

Another object is to provide a means whereby when the plow share strikes the root of one of the trees, the share will automatically tilt upwardly and pass over the root without uprooting or ruining the tree.

Still another object is to provide a single means both to impart horizontal movement to the plow beam and yet maintain the rigid vertical position of the same.

A further object is to provide the structural parts of the plow at as low a level as possible to prevent the possibility of the same striking or injuring the trees or vines as it passes beneath or near the same.

I have also produced a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a perspective view of the preferred form of my improved plow.

Fig. 2 is a fragmentary top plan view of a means for moving the plow beam in a horizontal direction.

Fig. 3 is a fragmentary plan view showing the swivel mounting of the plow beam to the main frame.

Fig. 4 is a perspective view of a modified form of plow.

Fig. 5 is a fragmentary view of the end of the plow beam showing the action of the plow when it strikes an obstruction underground.

Fig. 6 is a fragmentary view of a link and operating rod connection.

Referring now more particularly to the characters of reference on the drawings, the numeral 1 designates the main supporting beam comprising with the transverse beam 2 the main frame of the plow.

A land wheel 3 is mounted to one side of the beam 2 in a manner similar to that shown in my previous application for patent, filed May 28th, 1917, Serial Number 171,395, allowed September 27th, 1918.

A furrow wheel 4 is mounted on a spindle projecting from an upwardly extending arm 5 journaled under the beam 1. This wheel has an adjusting means 6 of the same description as that shown in my previous application, above referred to.

The salient feature of my improved plow comprises a plow beam 7 swivelly mounted to the beam 1 as at 8, for horizontal movement relative thereto.

The rear end of the plow beam is forked as at 9, to receive therebetween a horizontal beam 10 which is pivoted to the fork at the open end thereof as at 11$^a$. Depending downwardly from this pivotal point and integral with the beam 10 is a vertical bar 11 on the lower end of which the plowing device 12 is mounted.

The forked portion 9 of the plow beam 7 and the horizontal bar 10 therebetween are provided with alined holes 20, through which are adapted to pass wooden pins 21 of a strength sufficient to cause the bar 11 to normally retain its vertical position while plowing, but breaking when the plow share comes in contact with a thick root underground, in which case the bar 11 tilts upward and permits the share to pass over the root without cutting the same or tearing it out of the ground.

On the inner face of this vertical beam 11 are strong bearings 13 in which is turnably mounted a rigid vertical rod 14 of substantial construction, the same being mounted on the bar in a manner to prevent vertical movement of either one relative to the other as by means of a cotter pin 14ª or the like.

Adjacent the beam 2, the rod 14 turns at a right angle and runs parallel to the beam 2, substantially in line with the pivotal connection 11ª of the plow beam as at 14ᵇ, and is held in horizontal bearings 15 in which it is slidable. Horizontal movement is given this rod through the medium of a post 16 turnably mounted on the beam 2 and having a hand wheel 17 thereon. An arm 18 projects at right angles to the post 16 under the beam 2, the arm being flexibly connected to the end of the rod 14 by means of a bar 19, the end of said rod at this point being turned down to form a short arm 14ᶜ, which passes loosely through a hole 19ª in the end of the bar 19, as shown in Fig. 4.

By reason of such loose connection and the shortness of the arm 14ᶜ, even when the pins 21 break and the plow beam 10 swings upwardly, no material binding or movement of the member 19 takes place, as the plow will only turn through an arc of 35° or less, and the said loose connection is sufficient to accommodate this, taken in connection with the very slight movement which the arm 14ᶜ will have.

It will be noted that with the horizontal movement given to the plow beam by means of the rigid bar attached against vertical movement thereto, the plow beam and share may be moved horizontally without altering the vertical alinement thereof and permitting it to cut to an equal depth in all positions.

Among the most important of my improvements is the feature of the rigid bar 14 lying along the vertical beam 11 and extending thence at right angles but rigidly, as at 14ᵇ, through the bearings 15. This supports and braces the vertical beam 11 which is subjected to a terrible strain and holds it straight and vertical at all times without any play or spring and prevents bending or breaking of the same. Also the push of the portion 14ᵇ is distributed equally against the full length of the vertical beam 11 which will cause a positive and accurate movement.

In the modified form shown in Fig. 4, the plow beam 7ª is made of one piece and is moved horizontally by means of a rod 22 secured to the same and extending to an arm 18ª projecting from the post 23, which has a hand bar or arm 24 thereon. The vertical position of the beam 7ª is maintained by means of a transverse beam 25 slidably mounted on the beam 1 and riding on rollers 26 thereon, the beam 25 passing over the beam 7ª and being swivelly secured thereto by means of a U-clamp 27. Dirt may be kept away from this sliding beam by means of a removable cover 28 positioned thereover.

Adjustment of the furrow wheel in this case is had by means of a lever and ratchet quadrant mechanism 29 from which a rod 30 extends down to a point adjacent the spindle of the wheel 4.

The plowing device may be reversible so as to throw the dirt in one direction or the other.

From the foregoing description it will be readily seen that I have produced a tractor cut-out plow which may be operated to cut out of a straight line without moving the motive power. The advantages of this will be obvious to one skilled in the art. The plow may be drawn by any motive power found desirable. The various adjustable features for regulating the depth, width or any other relative position of the plow parts gives my farm implement an efficiency far exceeding anything which to my knowledge has been heretofore produced.

It will also be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A plow comprising a wheel supported frame, a beam swivelly mounted at the forward end of the frame for horizontal movement relative thereto, a vertical plow beam at the free end of the first named beam and having a plowing device fixed to the lower end thereof, a rigid vertical bar swivelly mounted on the inner face of the plow-beam holding the latter against relative vertical movement and then extending at right angles transversely of the frame and being slidably mounted on the latter whereby the vertical position of the plow is maintained, and means for moving the angled bar horizontally to alter the path of travel of the plowing device.

2. A plow comprising a wheel supported frame, a beam swivelly mounted at the forward end of the frame for horizontal movement relative thereto, a vertical plow beam pivoted to the free end of the first named beam and having a plowing device fixed to the lower end thereof, means normally holding the vertical plow beam against rotation but permitting movement thereof when the plow strikes an obstruction, a rigid vertical bar swivelly mounted on the inner face of the plow beam holding the latter against relative vertical movement and then extending at right angles transversely of the main frame substantially in line with the pivotal connection of the plow beam and being slidably mounted on the latter whereby the position of the plow beam is maintained, and means for moving the angled bar in a horizontal direction to alter the path of travel of the plowing device, such means being arranged to allow rotation of the transverse extension of the rigid bar when the plow beam moves about its pivotal point.

In testimony whereof I affix my signature in presence of two witnesses.

JACOB T. ONSTOTT.

Witnesses:
 HATTIE A. WARE,
 F. B. WARE.